United States Patent [19]

Bagley et al.

[11] Patent Number: 5,706,410
[45] Date of Patent: Jan. 6, 1998

[54] PRINTING SYSTEM HAVING CONTROL LANGUAGE COMMAND AND RASTER PIXEL IMAGE DATA PROCESSING CAPABILITY

[75] Inventors: Elizabeth L. Bagley, Meridian; Gary D. Zimmerman, Boise; Vincent J. Kenkel, Boise; Jonathan M. Baker, Boise; Prabal Bhattacharya, Boise, all of Id.

[73] Assignee: Hewlett-Packard Company, Palo Alto, Calif.

[21] Appl. No.: 533,488

[22] Filed: Sep. 25, 1995

[51] Int. Cl.$^6$ .................................................. G06K 15/00
[52] U.S. Cl. .................................................. 395/112; 395/114
[58] Field of Search ........................ 395/112, 114, 395/113, 115, 116, 101, 500, 828, 830, 831, 834, 835, 839, 882, 884, 892, 837, 838, 385, 527, 182.03, 117, 520, 109, 509, 102, 511, 105, 106, 107, 110, 521; 358/296, 468, 407, 437, 404, 442, 444, 470, 406, 467; 364/551.01; 400/76, 61–62; 347/14, 19, 142; 399/1, 8, 9

[56] References Cited

U.S. PATENT DOCUMENTS

| | | | |
|---|---|---|---|
| 5,075,874 | 12/1991 | Steeves et al. | 395/112 |
| 5,337,258 | 8/1994 | Dennis | 364/551.01 |
| 5,353,388 | 10/1994 | Motoyama | 395/114 |
| 5,490,237 | 2/1996 | Zimmerman et al. | 395/114 |

*Primary Examiner*—Edward L. Coles, Sr.
*Assistant Examiner*—Dov Popovici

[57] ABSTRACT

A host computer includes a processor, a first memory for storing a bit map representation of an image to be printed, and a second memory for storing a control language representation of an image to be printed. The host computer further includes a printer driver for enabling dispatch of the bit map representation to a connected printer. The printer includes a print engine, a printer processor and control memory for storing bit map control code which controls the printer processor to render the print engine able to print an image defined by a bit map representation. The control memory further includes control language code for controlling the printer's processor to render the print engine able to print an image defined by a control language representation. Within the host computer is an interface module, controlled by the host printer driver, for interrogating status information from the printer. When the printer is under control of the control language code and a bit map representation is to be transmitted to the printer by the host computer, the interface module terminates a bilateral communication protocol and transmits a command to the printer, enabling operation of the bit map control code contained within the printer's control memory. The printer's processor disables the control language code and enables the bit map control code, thereby enabling the printer to receive and process the bit map data.

10 Claims, 5 Drawing Sheets

PRINTING SYSTEM HAVING CONTROL LANGUAGE COMMAND AND RASTER PIXEL IMAGE DATA PROCESSING CAPABILITY

CROSS-REFERENCE TO RELATED APPLICATIONS

The present application is related to the following co-pending U.S. Patent Applications being assigned to the same assignee, entitled: "A HOST BASED PRINTING SYSTEM WITH RASTER IMAGE DATA BUFFERING", Ser. No. 08/533,626 incorporated herein by reference.

FIELD OF THE INVENTION

This invention relates to page printers and, more particularly, to a page printer which includes firmware for processing both image data received in a control language format or in a bit map format, and wherein a connected host computer is operating under control of a Windows operating system (Windows is a trademark of the Microsoft Corporation, Redmond, Washington).

BACKGROUND OF THE INVENTION

Many laser printers are configured to receive data from a host computer in a control language format. A widely used control language is called "printer control language" (PCL). When operating in a PCL environment, a host computer configures a data stream to include both print function commands and interspersed print data. The printer converts the received data stream into a list of simple commands, called display commands, which define what must be printed. The printer then processes the display commands and renders the described objects into a raster bit map. In general, only a small proportion of the printer's available memory is allocated to storage of the print function commands and interspersed data, with the majority of the print buffer area being given over to support of processing functions and the resultant raster bit map image.

Other printer systems employ a procedure wherein the host computer rasterizes image data and sends it to the printer in the rasterized form. Such data is transmitted to the printer at high data rates and is termed in the art as the "Sleek" printing mode. Recently, the Microsoft Corporation has implemented a Sleek print facility called the "Windows Printing System" (WPS). WPS implements a Sleek approach to data transfers between the host computer and an attached printer. The WPS Sleek facility enables the use of a host computer's more powerful processor to accomplish the rasterization of an image and then transfers the rasterized image to the printer.

In typical page printers, all control of the print engine is handled through a combination of firmware and hardware. In a printer configured to interface with a host computer operating with WPS, all print engine control (page motion, engine status requests, engine status reads, etc.) is directed by the WPS software from the host computer to an application-specific integrated circuit (ASIC) incorporated into the printer.

In order to accommodate such remote print engine control and the high data transfer rates required for real time printing, the WPS facility employs a communication protocol that enables both high speed data transfers to the printer and reverse direction monitoring of printer status signals. One such communication protocol is the IEEE 1284 ECP protocol entitled "Standard Signalling Method for a Bi-directional Parallel Peripheral Interface for Personal Computers".

In employing such a data transfer protocol, the host computer negotiates into, for instance, the ECP mode. ECP supports a logical channel selection by the host computer which enables control of the printer's Sleek ASIC. A logical channel is established when the host computer sends a specific code value to the printer which, in turn, recognizes that value as defining a particular logical channel over which information is to be transmitted, either from the host computer to the printer or vice-versa. One such logical channel enables the host computer to detect the values in a printer status register which identify printer state conditions. While the ECP mode will hereafter be discussed, those skilled in the art will realize that any protocol which enables high speed bilateral communications between a printer and a host computer is equally usable in place thereof.

A majority of laser printers on the market support only a single "personality," i.e., a method of defining and printing a print job (such as PCL, PostScript, WPS, etc., etc). The Microsoft WPS system is designed to support a single-personality printer, i.e. one containing the WPS ASIC chip. If a print job is created on a host computer, using a non-WPS format, the print job must be converted into the WPS format in order to print properly on such a printer.

In order to capture a non-WPS formatted print job, WPS traps the print data and redirects it through its own processing. Once redirected, the print data is recognized as non-WPS and is subjected to an emulation process. Currently, WPS can only emulate the PCL printer control program. After emulation, the print data appears in a format that is identical to that generated from the WPS printer driver, allowing the rest of the WPS software to handle the data in a similar manner. The resulting emulation, when executed by a receiving printer does not execute in the same efficient manner as does a printer containing PCL firmware which is supplied with standard PCL commands and data. Further, when using the WPS emulation approach, there is no guarantee that the emulated PCL will match exactly with the personality implemented in the printer. There is also the possibility of a gap between levels of personality supported between the host emulation and the printer. For example, if a new version of PCL is issued, there is no guarantee that the emulation will be able to accommodate the new version.

Accordingly, it is an object of this invention to provide a host computer having a WPS printer driver with the capability to directly support and interface with a printer having resident PCL firmware.

It is another object of this invention to provide a host printer driver, having WPS capability, with the additional capability to remotely switch a printer between a Sleek printing mode and a PCL printing mode, in dependence upon the print job to be transmitted to the printer.

It is yet another object of this invention to provide a WPS driver-containing printer with the ability to directly provide non-emulated PCL commands to a connected printer.

SUMMARY OF THE INVENTION

A host computer includes a processor, a first memory for storing a bit map representation of an image to be printed, and a second memory for storing a control language representation of an image to be printed. The host computer further includes a printer driver for enabling dispatch of the bit map representation to a connected printer. The printer includes a print engine, a printer processor and control memory for storing bit map control code which controls the printer processor to render the print engine able to print an image defined by a bit map representation. The control memory further includes control language code for controlling the printer's processor to render the print engine able to print an image defined by a control language representation. Within the host computer is an interface module, controlled by the host printer driver, for interrogating status information from the printer. When the printer is under control of the control language code and a bit map representation is to be transmitted to the printer by the host computer, the interface module terminates a bilateral communication protocol and transmits a command to the printer, enabling operation of the bit map control code contained within the printer's control memory. The printer's processor disables the control language code and enables the bit map control code, thereby enabling the printer to receive and process the bit map data.

DETAILED DESCRIPTION OF THE INVENTION

Figure 1:
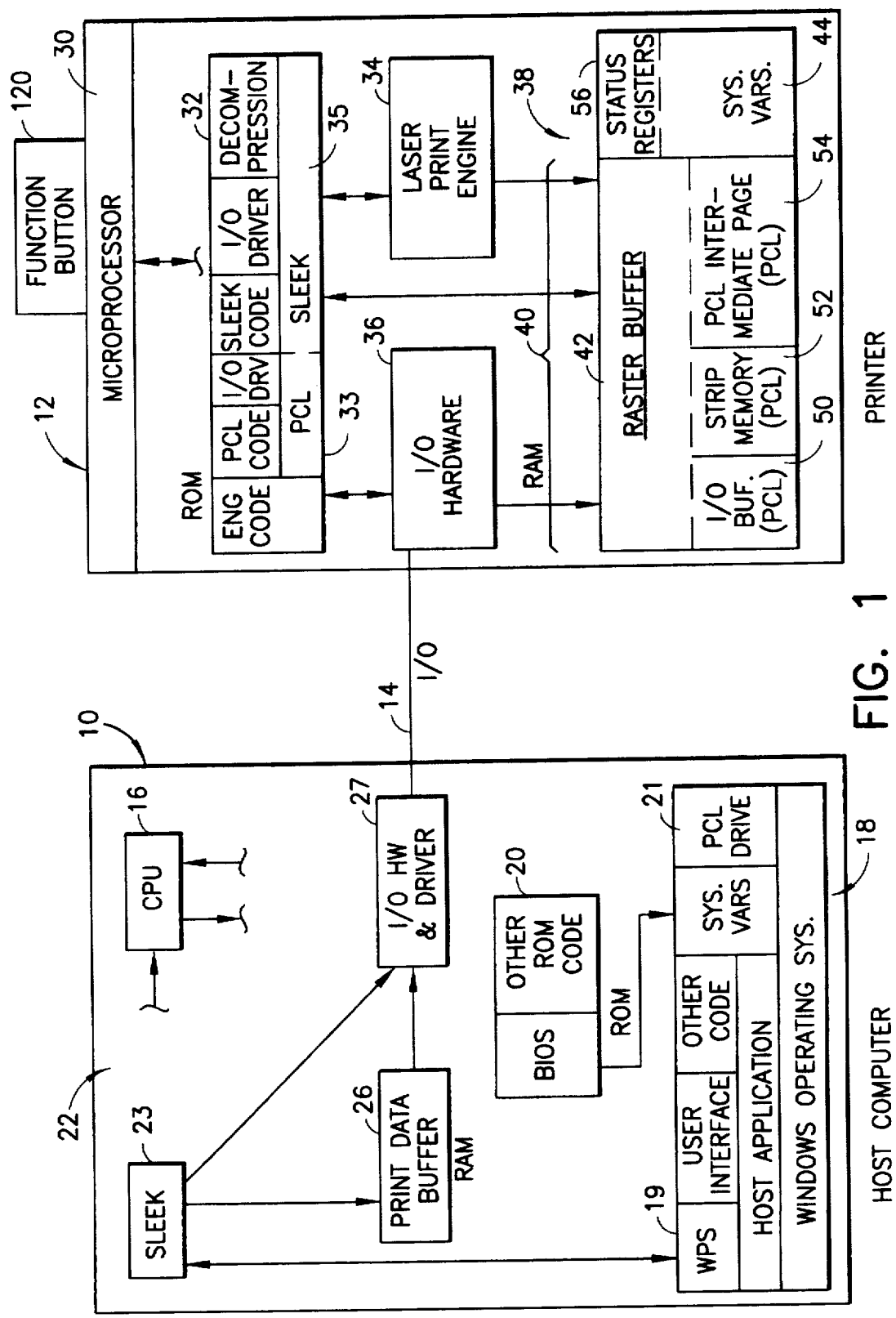
FIG. 1 is a block diagram showing internal aspects of both a host computer and an attached page printer, wherein both have been modified to incorporate the invention hereof.

Referring to FIG. 1, a host computer 10 is connected to a printer 12 via an I/O interface 14 which enables high speed data transfers. For the purposes of this description, host computer 10 will be assumed to be a personal computer and printer 12 a laser printer. It will be further assumed that I/O interface 14 which enables an "ECP" mode data transfer (e.g., data transfers at approximately 500k bytes per second).

Host computer 10 includes a central processing unit 16 and a random access memory (RAM) that is segmented into a number of portions. RAM portion 18 contains a software code for implementing a Windows operating system; a Windows printing system (WPS) driver 19; a PCL driver 21; user interface data; and a host application. PCL driver 21 is accessible through a Windows "box" which, upon being selected by a mouse click, enables DOS-based commands (e.g. PCL commands) to be output under the control of the Windows operating system.

A read-only memory (ROM) 20 includes firmware for controlling the basic input/output system (BIOS) and code for controlling other host functions. A further RAM portion 22 includes printer-driver software for enabling host computer 10 to operate in the Sleek mode 23, in combination with WPS driver 19.

A further portion of RAM is set aside to act as a print data buffer 26 for containing raster image data that has been formatted by Sleek driver 23 and is ready to be transferred to laser printer 12 via I/O hardware and driver module 27.

PCL driver 21, under control of the Windows operating system, configures and feeds PCL print commands and data to Sleek module 23 where it is implemented into a Sleek format and transmitted as Sleek data over interface 14 via I/O hardware and driver 27.

A microprocessor 30 controls the overall functions of printer 12 and its modules. A read only memory (ROM) 32 contains both PCL mode firmware 33 and Sleek mode firmware 35 for controlling a laser print engine 34. PCL mode firmware 33 enables received PCL-configured code to be converted to a page intermediate form and then formed into a raster configuration for printing by laser print engine 34. The I/O driver portion of PCL mode firmware 33 controls I/O hardware module 36 to properly respond to received PCL commands and data.

Sleek mode firmware 35 is a bit map control code and includes a Sleek code section that allocates a portion of RAM 38 as an I/O buffer 40, and an I/O driver control section. I/O buffer 40 serves either as a raster image buffer 42 or as a control language/data buffer 50, 52, 54. When buffer 40 is configured as a raster image buffer 42, it receives raster-formatted data from I/O hardware 36 and stores it temporarily, prior to feeding it to print engine 34. Otherwise buffer 40 is configured to include portions 50, 52 and 54 for use when receiving PCL data from host computer 10. Portion 50 serves as an I/O buffer; portion 52 as a storage for page strips created during PCL processing; and portion 54 contains intermediate code created during PCL mode processing actions. It is to be understood that when in the Sleek mode, the entirety of RAM 40 is allocated for use as raster image buffer 42. By contrast, when printer 12 is in the PCL state, substantially all of buffer 40 is allocated for use as portions 50, 52 and 54.

Within systems variables portion 44 of RAM 38 is a group of status "registers" 56 which include entries that indicate the status of various functions and states in printer 12. For instance, status registers 56 indicate whether a paper out condition exists; a paper jam condition; a printer door open condition; or whether a PCL job is active. The states manifested by status registers 56 are determinable by host computer 10 when interface 14 operates in the ECP mode. In such mode, a number of logical channels are establishable, some of which enable reverse data flow from printer 12 to host computer 10, and enable interrogation of printer status information.

Figure 2:
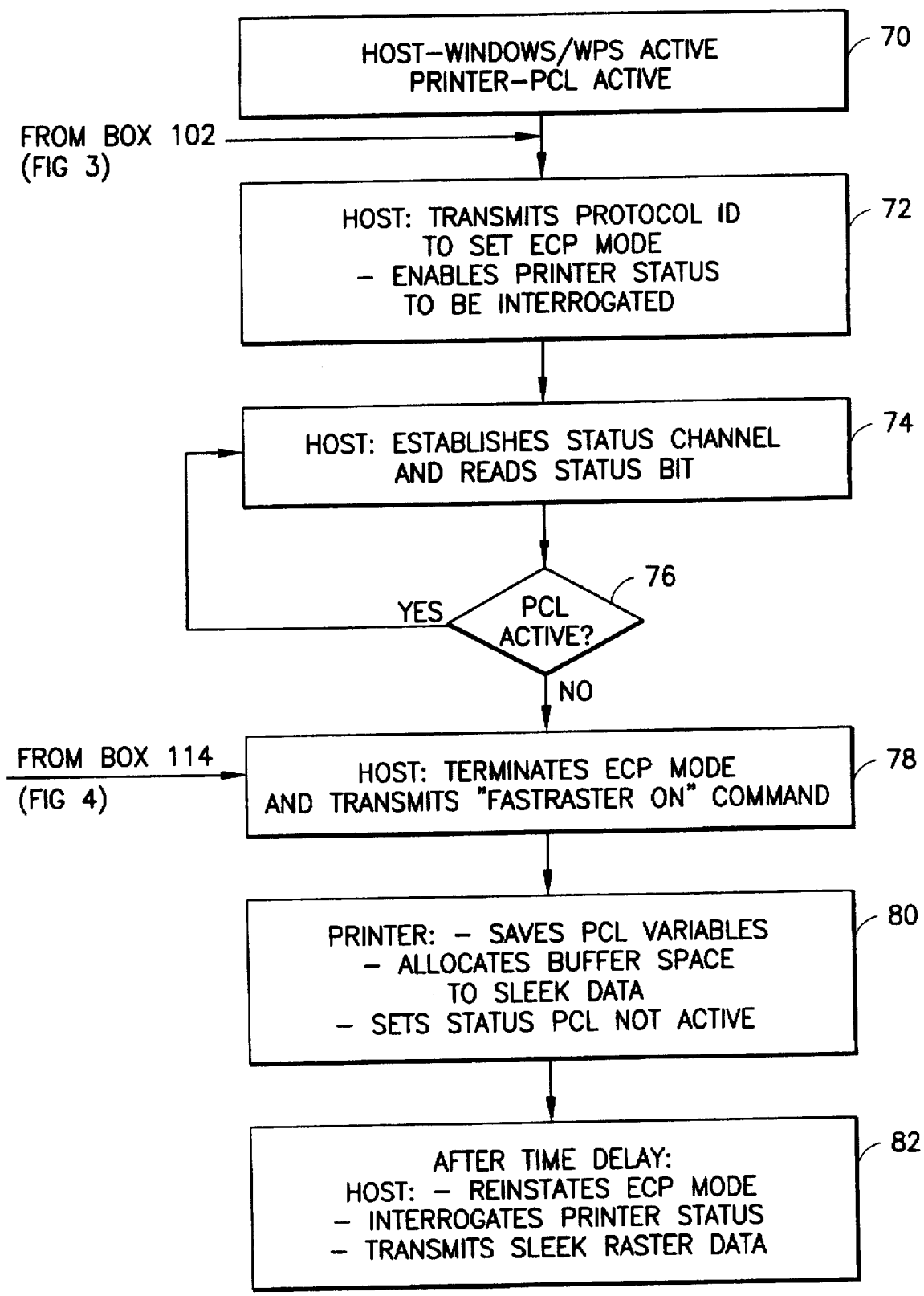
FIG. 2 is a high level logic flow diagram illustrating the operation of the system of FIG. 1, when the printer is in the PCL mode.

Turning to FIG. 2, it will be assumed that host computer 10 is operating under the Windows operating system and that WPS driver module 19 is active. Further, it will be assumed that printer 12 is operating under control of PCL mode firmware 33 (see box 70). The latter state can occur at power-on (when printer 12 enters its default state, i.e. the PCL mode) or when printer 12 is in the process of executing a PCL print job. Assume further that host computer 10 wishes to return printer 12 to the state where Sleek mode firmware 35 is operative in controlling the operation of printer 12. This action can occur when host computer 10 has a Sleek print job to transmit to printer 12 or can happen when host computer 10 is programmed to attempt to continually maintain printer 12 in a state which implements the Sleek mode firmware 35.

Under such a condition, host computer 10 transmits a protocol identifier which is recognized by microprocessor 30 as establishing the ECP data transmission protocol. As above indicated, the ECP protocol enables high speed data transfers to take place over I/O interface 14 and further enables reverse direction status data to be transmitted between I/O hardware 36 and I/O hardware and driver 27 (box 72).

In response to receiving the protocol identifier, printer 12 (after some initial negotiations with host computer 10) enters the ECP mode. As such time, host computer 10 transmits a code value which establishes a logical channel to enable the values in status registers 56 to be interrogated (box 74). One of those values indicates whether a PCL job is active in printer 12. So long as a PCL job is active (decision box 76), the procedure recycles, and host computer 10 continues to interrogate, at periodic intervals, the PCL job status bit. When that status bit indicates that a PCL job is no longer active, host computer 10 terminates the ECP mode (box 78) and transmits a special "Fastraster ON" command.

It is to be understood that the Fastraster ON command does not exist in prior art WPS implementations (wherein Sleek mode is always active), because all print data from host computer 10 was transmitted in raster bit map form. Under WPS, printer 12 had no capability to operate under resident PCL firmware control.

Upon receiving the Fastraster ON command, microprocessor 30 (box 80) saves all PCL variables and re-allocates portions 50, 52 and 54 of buffer 40 (previously used for PCL actions) for use as raster buffer 42. Upon completing such reallocation, microprocessor 30 resets a status bit in status registers 56 to indicate the availability of printer 12 to receive Sleek raster data.

Because host computer 10 is unable to determine the state of printer 12 unless I/O interface 14 is in the ECP mode, host computer 10 waits a preset time after it transmits the Fastraster ON command and unilaterally commences a reinstatement of the ECP mode. Upon such reinstatement (box 82), host computer again examines status registers 56. At such time, if status registers 56 no longer manifest a PCL job active status, host computer 10 initiates transfer of either an awaiting Sleek print job or proceeds to another function, knowing that printer 12 is now in the Sleek mode.

Figure 3:
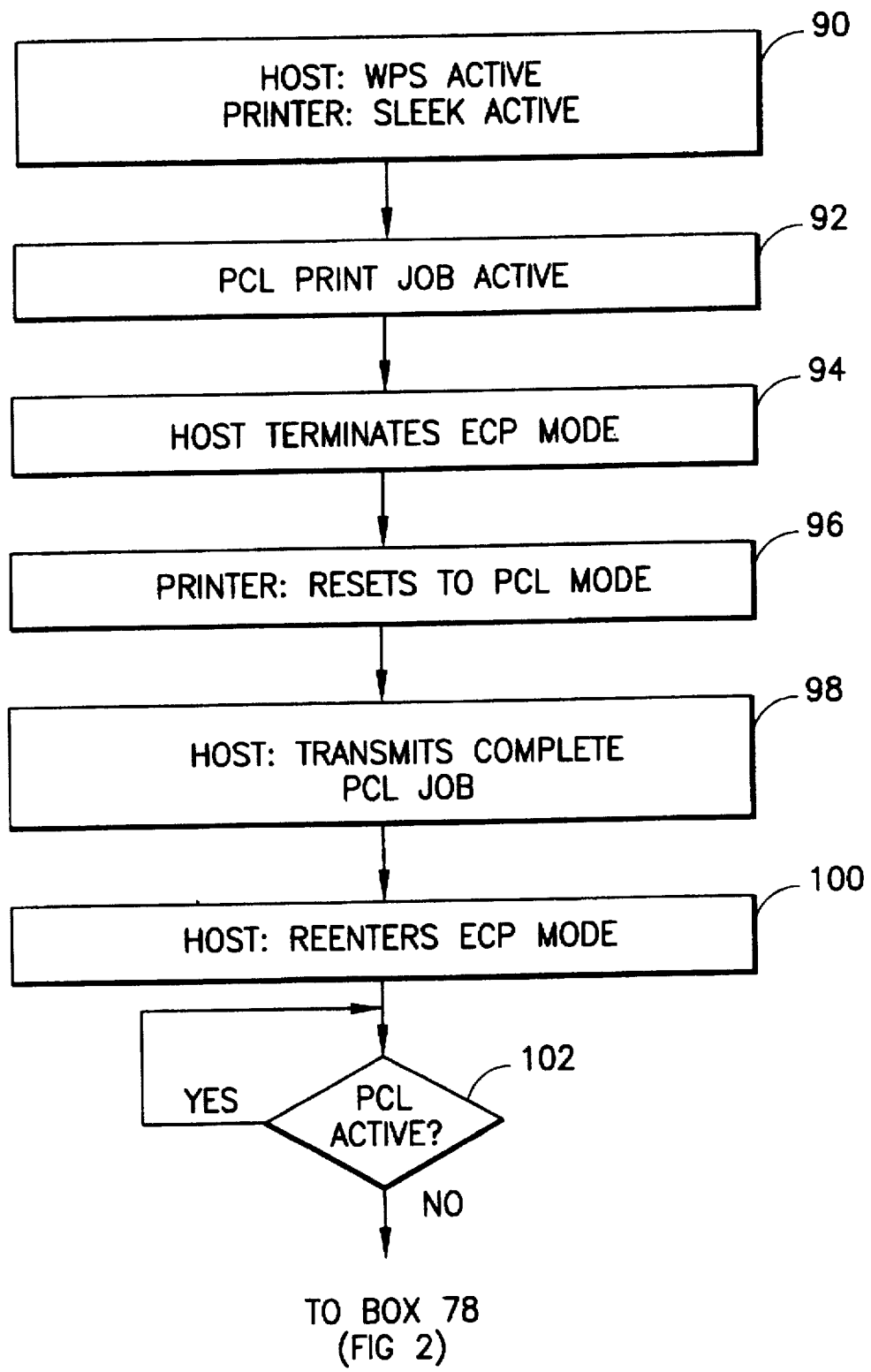
FIG. 3. is a high-level logic flow diagram illustrating the operation of the system of FIG. 1 when the printer is in the Sleek mode.

Turning to FIG. 3, assume that WPS driver 19 is active in host computer 10, and that printer 12 is in the Sleek mode (box 90). Further, assume that PCL driver 21 outputs a print job in PCL format (box 92). In response, WPS driver causes computer 10 to exit from the ECP mode. Printer 12 then resets to PCL and saves the extant Sleek mode parameters (box 96).

After transmission of the complete PCL job (box 98), host computer 10 re-establishes the ECP mode (box 100) and interrogates status registers 56 to determine whether the PCL job is still active in printer 12 (decision box 102). If yes, host computer 10 reinterrogates status registers 56 on a continuing basis until there is an indication that the PCL job has completed. At such time, the procedure reverts to box 72 in FIG. 2 and resets printer 12 to the Sleek mode.

PCL print jobs do not necessarily include an end of job marker, and there are a number of conditions which cause a PCL job not to end with a page eject command. Thus, a PCL job can stay resident in the printer until the user performs some action to cause a page ejection to occur. As a result, status registers 56 can continue to manifest a PCL job active state and effectively prevent host computer 10 from returning to the Sleek mode.

Figure 4:
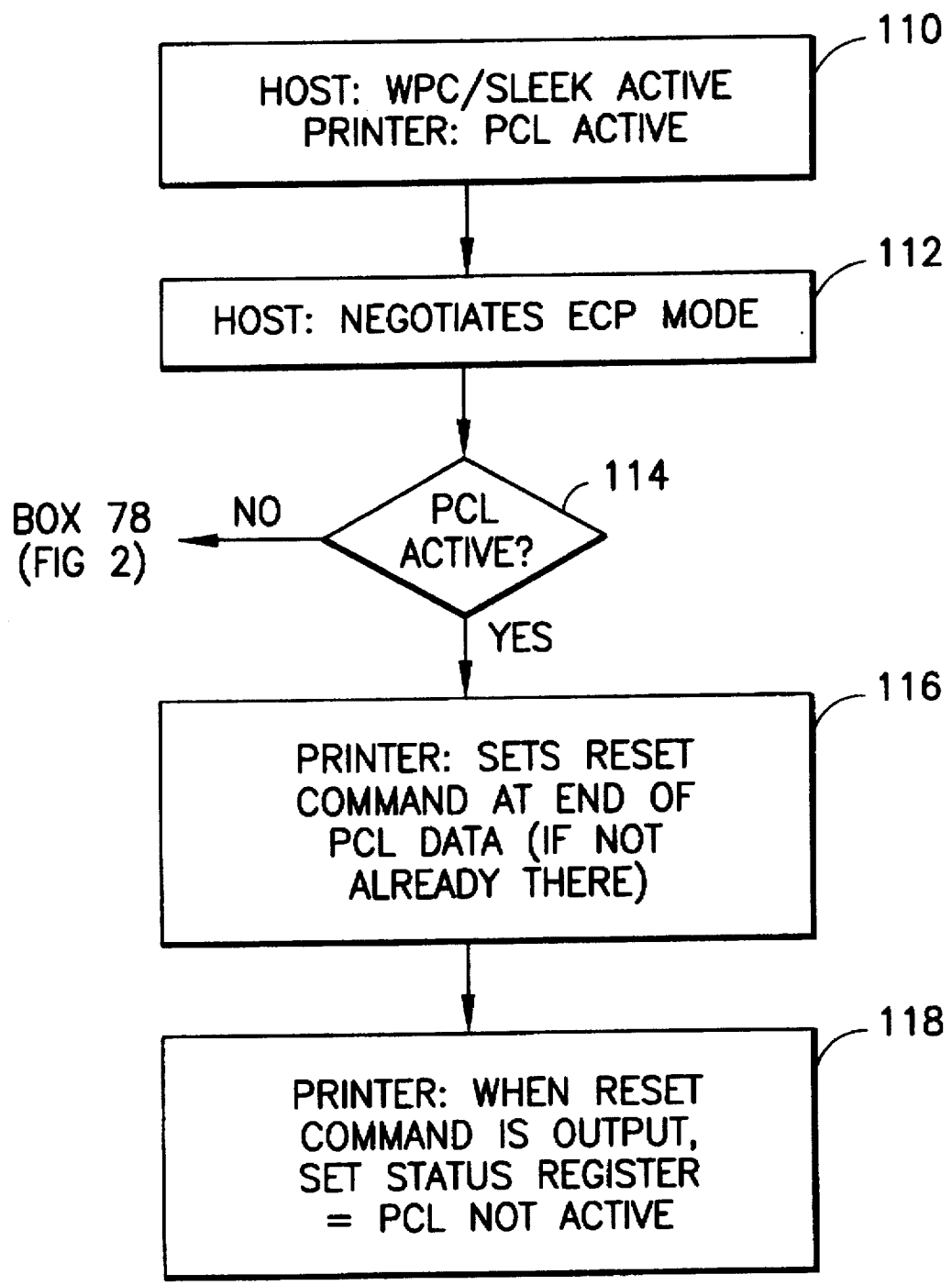
FIG. 4. is a high-level logic flow diagram illustrating the operation of the printer of FIG. 1 when the printer is reset to the Sleek mode, after completing a PCL job.

Printer 12, however, knows when host computer 10 has completed transmitting a PCL job. This is so because host computer 10, at such time, commences renegotiation of the ECP protocol (box 72, FIG. 2). Upon re-establishment of the ECP mode, host computer 10 interrogates status registers 56 over a logical channel. As shown in FIG. 4 and assuming that printer 12 is in the PCL mode and that host computer 10 has just completed transmission of PCL commands to printer 12 (box 110), host computer 10 commences negotiating the ECP mode (box 112). Thereafter, a logical channel is created which allows host computer 10 to interrogate status registers 56 and to determine whether the PCL job is still active in printer 12 (decision box 114).

Printer 12, upon detecting that status registers 56 have been interrogated, knows that host computer has completed transmission of all PCL data. Printer 12 thus appends a Reset command to the end of the PCL job which remains in buffer memory 40 (box 116). That Reset command causes a page eject at the end of the PCL job. PCL mode firmware 33 causes microprocessor 30 to process the Reset command, when it is read from buffer 40, as if host computer 10 had sent a page eject command at the end of the PCL data stream. The Reset command thus causes the page to be ejected and updates the PCL status in status registers 56 to indicate that a PCL job is no longer active (box 118). Thereafter, host computer 10 is free to re-establish and reallocate buffer 40 for Sleek operations.

Prior art page printers go to an "offline" state when a paper bin becomes empty, when paper becomes stuck inside the printer (a paper jam) or when the printer's front door is open. Once the printer is in an "offline" state, the printer refuses to accept any further data. The condition that sets the printer into the offline state must be cleared before the printer can accept data again. In the configuration shown in FIG. 1, when printer 12 is in the Sleek mode, it never enters an "offline" state. The printer will handshake data from host computer 10 even if it is in a paper out, paper jam or door open state. The existence of such a state is reported back to host computer 10 via interrogation of status registers 56.

On the control panel of page printers, there are typically one or more buttons 120 (FIG. 1) for initiating a well-defined printer function. One such button 120 initiates paper movement during a "manual feed" print job and another enables a "reset" action. Depending upon whether the printer is in a Sleek or PCL mode, the result of such a button press is implemented differently.

When printer 12 is in the Sleek mode, it cannot immediately act upon a user's button press by performing the requested function, as host computer 10 will be unaware that a printer status change has occurred. It will be recalled that host computer 10 periodically interrogates status registers 56 during the operation of printer 12; however, if a button press occurs between interrogations, host computer 10 is unaware that the status of printer 12 has changed as a result of the user action.

To prevent confusion of host computer 10, printer 12 implements a time delay in any response to a button press. That time delay is set to encompass the longest period of time between interrogations of status registers 56. The time delay allows host computer 10 to gather status from status registers 56 (which additionally indicate that the button press has occurred) and to thereby determine that a function commanded by the button press is to take place.

Figure 5:
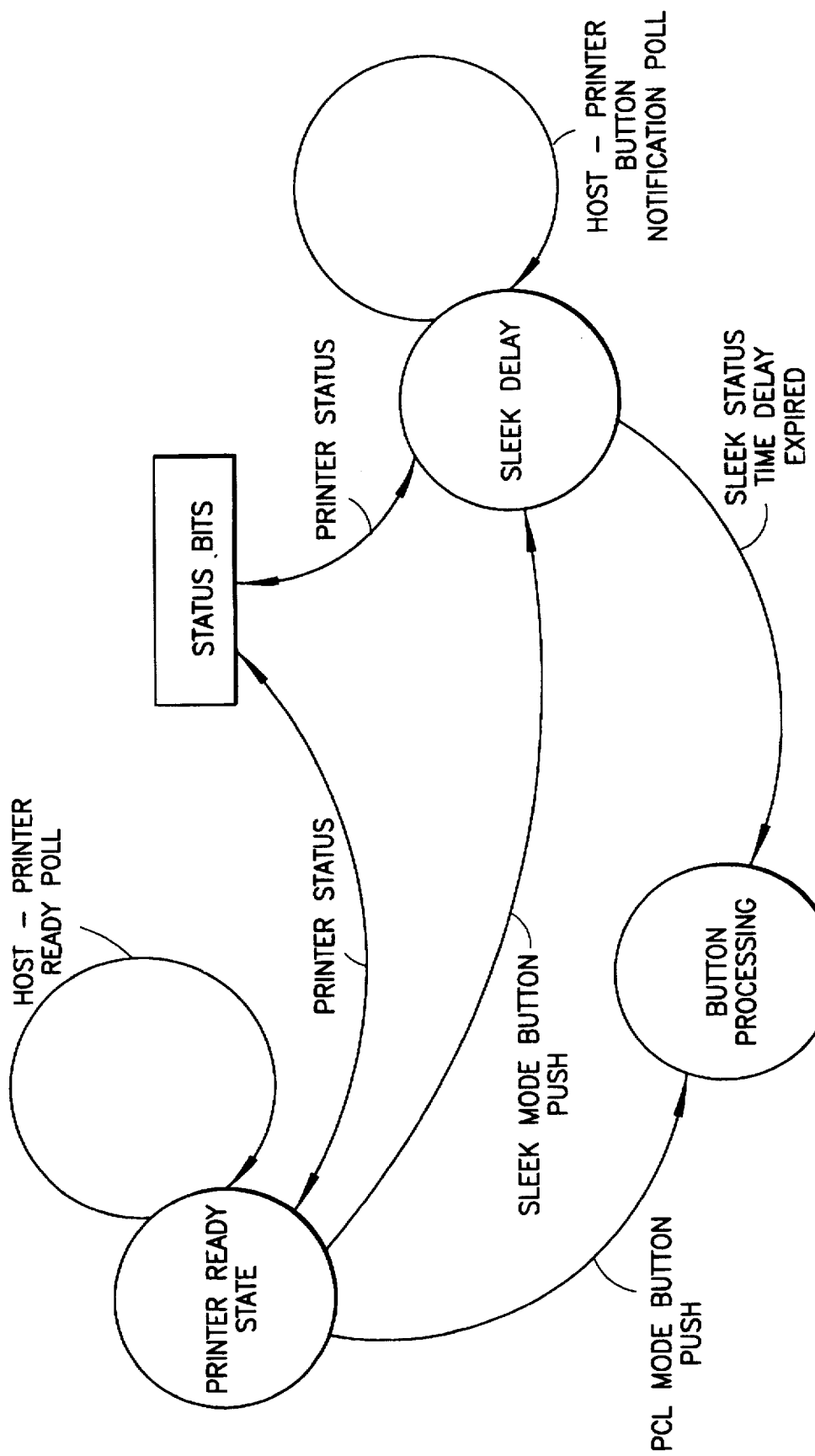
FIG. 5 is a state diagram which illustrates the printer's reaction to a key press in dependence upon whether the printer is in the PCL or Sleek mode.

In FIG. 5, a state diagram illustrates the affect of the time delay. Note that if a button is actuated, a Sleek delay is implemented which causes a delay in the processing of the action commanded by the button press. During the delay period, the Sleek control program enters a status bit into status registers 56 indicative of the button press (which is then interrogated by host computer 10). Thereafter, the processing of the button press can occur.

If the printer is in a PCL mode, the button press can be operated upon without delay as there is no on-going monitoring of printer status until the PCL job has been completed.

A similar delay function can be implemented if a logical button press is commanded by host computer 10. More specifically, a logical button press by host computer 10 provides identical functionality as a physical button press on printer 12. This capability is implemented through use of a logical channel. By selecting a specified logical channel, host computer 10 can indicate to printer 12 (which is configured in the Sleek mode), to activate a procedure as though a button actually had been pressed. Host computer 10 can additionally select a duration for the logical button press by providing such data via the logical channel. The Sleek firmware in printer 12, upon receipt of this logical channel message, sends a "button pressed" message to the firmware task within printer 12 which manages keyboard actuations. This message is identical in form to the message sent when a physical button press occurs.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system comprising:
    host computer means including a first and second host memory means for storing a bit map representation of an image and a control language representation of an image, respectively;
    a printer including a print engine means and printer processor means;
    host printer driver means associated with said host computer means for enabling dispatch of said bit map representation to said printer;
    control memory means resident in said printer for storing both bit map control code for enabling said print engine means to print a bit map image representation as received from said first host memory means, and control language code for enabling said print engine means to print a bit map image defined by said control language representation as received from said second host memory means; and
    interface means in said host computer means and controlled by said host printer driver means to enter a bilateral communications mode when a bit map representation is to be transmitted to said printer and to interrogate status data in said printer and, when said status data indicates that said printer is under control of said control language code and a control language print job is not active, to cause said printer processor means to disable said control language code and to enable said bit map control code.

2. The system as recited in claim 1, wherein said printer processor means enables, as a default state in said printer, operation of said control language code, whereby said printer is enabled to receive and process control language representations in said default state.

3. The system as recited in claim 1, further comprising:
    printer image memory means in said printer; and wherein said printer processor means responds to a command from said interface means when in said bilateral communications mode, by allocating storage space in said printer image memory means for storage of said bit map representation, said printer image memory means otherwise controlled by said printer processor means to reserve said storage space for processing of said control language code from an image encoded thereby.

4. The system as recited in claim 3, wherein said printer processor means is further responsive to said command to store variables associated with processing of said control language code for later retrieval.

5. The system as recited in claim 3, wherein said interface means only dispatches said command to said printer after said status data indicates that said printer has completed processing an image representation encoded with said control language code.

6. The system as recited in claim 5, wherein said printer processor means, in response to a status inquiry from said interface means, appends an ending code to said control language code resident in said printer image memory means, said printer processor means responsive to a subsequent sensing of said ending code to alter said status data to indicate that a control language job is not active.

7. The system as recited in claim 6, wherein said printer further includes a user-actuable function button, actuation of which causes said printer processor means to perform a function, said printer processor means activating a time delay before performing said function, said time delay at least equal to a time interval between status inquiries received from said interface means.

8. A system comprising:
    host computer means including a first host memory means for storing a bit map representation of an image to be printed;
    host printer driver means for enabling dispatch of said bit map representation to a printer;
    second host memory means for storing a control language representation of an image;
    wherein said printer includes a print engine means and printer processor means;
    control memory means resident in said printer for storing both bit map control code for enabling said print engine means to print a bit map image representation as received from said first host memory means, and control language code for enabling said print engine means to print a bit map image defined by said control language representation as received from said second host memory means; and
    interface means in said host computer means, controlled by said host printer driver means to function in a bilateral communications mode, and operative, when a control language representation of an image is to be transmitted to said printer and said printer is under control of said bit map control code, to cause a termination of said bilateral communications mode, said printer processor means responding to said termination by disabling said bit map control code and enabling said control language code in preparation for receiving said control language representation of said image.

9. The system as recited in claim 8, further comprising:
    image memory means in said printer; and wherein said printer processor means responds to termination of said bilateral communications mode by allocating storage space in said image memory means for processing of said control language code from an image encoded thereby.

10. The system as recited in claim 9, wherein said interface means, after completion of transmission of said control language representation of said image, reestablishes said bilateral communications mode and interrogates status data stored in said printer, said interrogation causing an end of job code to be appended to a control language job still resident in said image memory means.

* * * * *